(12) United States Patent
Otsuka et al.

(10) Patent No.: US 8,730,325 B2
(45) Date of Patent: May 20, 2014

(54) TRAVELING LANE DETECTOR

(75) Inventors: Yuji Otsuka, Hitachinaka (JP);
Masayuki Takemura, Hitachi (JP);
Tatsuhiko Monji, Hitachinaka (JP); Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 863 days.

(21) Appl. No.: 12/365,695

(22) Filed: Feb. 4, 2009

(65) Prior Publication Data
US 2009/0201370 A1    Aug. 13, 2009

(30) Foreign Application Priority Data
Feb. 5, 2008    (JP) .................................. 2008-024906

(51) Int. Cl.
*G09B 9/04*    (2006.01)
*G06K 9/00*    (2006.01)
(52) U.S. Cl.
CPC .................................. *G06K 9/00798* (2013.01)
USPC ......................................................... 348/148
(58) Field of Classification Search
USPC ......................................................... 348/148
See application file for complete search history.

(56) References Cited

U.S. PATENT DOCUMENTS

| | | | | |
|---|---|---|---|---|
| 4,970,653 A * | 11/1990 | Kenue | ............................. | 701/301 |
| 5,642,093 A * | 6/1997 | Kinoshita et al. | ............. | 340/439 |
| 6,370,474 B1 * | 4/2002 | Hiwatashi et al. | ............ | 701/300 |
| 6,577,334 B1 * | 6/2003 | Kawai et al. | ................... | 348/148 |
| 6,731,332 B1 * | 5/2004 | Yasui et al. | ..................... | 348/148 |
| 6,882,287 B2 * | 4/2005 | Schofield | ....................... | 340/903 |
| 6,930,593 B2 * | 8/2005 | Crawshaw | ..................... | 340/435 |
| 7,446,798 B2 * | 11/2008 | Comaniciu et al. | ........... | 348/148 |
| 7,990,283 B2 * | 8/2011 | Breed | ............................. | 340/903 |
| 8,126,642 B2 * | 2/2012 | Trepagnier et al. | ........... | 701/423 |
| 2002/0095246 A1 * | 7/2002 | Kawazoe | .......................... | 701/1 |
| 2002/0145665 A1 * | 10/2002 | Ishikawa et al. | ............... | 348/148 |
| 2004/0201672 A1 * | 10/2004 | Varadarajan et al. | ......... | 348/148 |
| 2006/0020389 A1 * | 1/2006 | Yamamoto | ..................... | 701/213 |
| 2006/0132295 A1 * | 6/2006 | Gern et al. | ..................... | 340/438 |
| 2009/0245582 A1 * | 10/2009 | Sakamoto | ..................... | 382/104 |

FOREIGN PATENT DOCUMENTS

| | | |
|---|---|---|
| JP | 4-152406 A | 5/1992 |
| JP | 6-341821 A | 12/1994 |

\* cited by examiner

*Primary Examiner* — Ario Etienne
*Assistant Examiner* — Blake Rubin
(74) *Attorney, Agent, or Firm* — Crowell & Moring LLP

(57) ABSTRACT

A traveling lane detector according to the present invention includes: an imaging unit mounted on a vehicle to take a road surface image; and an image processor performing image processing on the image to detect lane marks on the road surface. The image processor judges whether the vehicle is crossing the lane marks, and, when the vehicle is not crossing any of the lane marks, defines first and second windows, in the image, for detecting the lane marks located respectively on left and right parts of a road surface in front of or behind the vehicle, performs image processing on the image in each of the windows to detect the lane marks, and, when the vehicle is crossing any of the lane marks, defines a third window including the currently-crossed lane mark in the image, performs image processing on the image in the third window to detect the lane mark.

5 Claims, 6 Drawing Sheets

TRAVELING LANE DETECTOR

BACKGROUND OF THE INVENTION

1. Field of the Invention

The present invention relates to a traveling lane detector used for detecting a lane on which a vehicle is traveling.

2. Description of the Related Art

Various techniques have been conventionally proposed for a traveling lane detector mounted on a vehicle such as an automobile. In these techniques, lane marks such as a white line drawn on a road are detected through image processing, and when the detection result reveals that the vehicle is out of the traveling lane, warning is issued to the driver, or the steering is controlled, for example.

Such lane mark detection generally uses a luminance difference between a lane mark and a road surface. A luminance difference between a lane mark and a road surface is clearly observed in an image taken from a vehicle, and a part that has a large luminance difference is called an edge. An edge corresponds to a boundary between the lane mark and the road surface, i.e., the outline of the lane mark. A larger luminance difference between adjacent pixels represents a larger edge strength. Parts each having a larger luminance difference than a predetermined threshold is extracted from the image by using a differential filter for detecting large luminance differences, and thereby edge parts of the lane mark can be extracted. Here, it is important to appropriately set this edge detection threshold, for the following reasons. When the edge detection threshold is set too high, edge parts of the lane mark cannot be detected. When the edge detection threshold is set too low, on the other hand, a number of parts that have nothing to do with the lane mark, such as the boundary of a shadow and dirt on the road surface, are extracted, resulting in erroneous detection. For accurate detection of a lane mark, it is desirable to set an edge detection threshold with which edge parts of the lane mark can be extracted stably while edges to be classified as noise can be excluded.

However, various types of lane marks are used depending on road surfaces, and are, for example, a white line, a yellow line and, in some areas, only raised pavement markers. Furthermore, even on the same road surface, the edge strength of a lane mark changes in accordance with the climate, time of a day, or the state of the road surface. In consideration of these circumstances, the edge detection threshold should rather be variable depending on road surfaces and situations, than fixed.

JP Published Patent Application No. H04-152406 A discloses a technique for setting an edge detection threshold value by using the average luminance value and the maximum luminance value of the entire image taken from the vehicle. With this technique, the threshold can be changed depending on the situation observed in the image; thus, more stable lane mark detection can be performed.

For example, assume that a lane with a white line as a vehicle-left-side lane mark and a yellow line as a vehicle-right-side lane mark is captured by a black-and-white camera. The luminance difference, thus also the edge strength, between a white line and a road surface is larger than that between a yellow line and a road surface, in general. Accordingly, in the above case, if only a single threshold is used, satisfactory extraction of edge parts of both the left and right lane marks is not possible because optimal edge detection thresholds for the left and right lane marks are different. Thus, it is desirable to set edge detection thresholds for the left and right lane marks individually.

JP Published Patent Application No. H06-341821 A discloses a technique for dividing an image taken from a vehicle into a left part and a right part, thereby setting an edge detection threshold and performing lane mark extraction processing and the like for each of the parts independently. With this technique, even when different types of lane marks are used on the left and right sides of a vehicle, an edge detection threshold value can be set appropriately for each of the sides. In addition, when different kinds of lane marks, for example, raised pavement markers on the left side and a white line on the right side, are used, a detection method itself as well as an edge detection threshold can be set differently for each of the sides.

However, when the left and right lane marks is detected from two simply-divided images, the following problem arises. When a vehicle crosses a lane mark while, for example, changing lanes, a lane mark 108 is sometimes positioned between two images 103 and 105 and on boundaries of the images 103 and 105, as shown in FIG. 5. In such a case, stable detection of the lane mark 108 may not be possible, because the lane mark 108 is outside the left and right images at the same time, ending up losing track of the lane mark 108. Once track of the lane mark is lost, it takes time to accurately detect the lane again, and vehicle control using results of traveling lane detection is not possible in the meantime.

In light of the problem, alternative methods, different from that using two simply-divided images, can be employed to detect lane marks. For example, trapezoidal windows 201 are used as shown in FIG. 6A, or multiple small rectangular windows 202 appearing only around lane marks are used as shown in FIG. 6B. These techniques are both capable of addressing the case in which the vehicle crosses a lane mark. However, in the techniques, the windows each move by following the position of a lane mark candidate detected first. For this reason, once a noise part, which is not a lane mark, is detected erroneously as the lane mark, the erroneous detection of the noise part may continue for a while. In addition, since windows used for detection have a more complicated shape than a rectangle, or a large number of windows are used, it is difficult to speed up processing by using parallel processing.

SUMMARY OF THE INVENTION

An object of the present invention is to provide a traveling lane detector that is capable of detecting a lane mark accurately and stably by simple processing even when a vehicle is crossing the lane mark.

To achieve the above-described object, a traveling lane detector according to the present invention includes: an imaging unit that is mounted on a vehicle to take an image of a road surface; and an image processor that performs image processing on the image and thereby detects lane marks on the road surface. The traveling lane detector has the following features.

The image processor judges whether the vehicle is crossing the lane marks. When the vehicle is not crossing any of the lane marks, the image processor defines a first window and a second window, in the image, for detecting the lane marks that are located respectively on left and right parts of a road surface in front of the vehicle or left and right parts of a road surface behind the vehicle, performs image processing on the image in each of the windows, and thereby detects the lane marks. When the vehicle is crossing any one of the lane marks, the image processor defines a third window including the currently-crossed lane mark in the image, performs image processing on the image in the third window, and thereby detects the lane mark.

The image processor sets a focus of expansion (FOE) on an upper center position of the image. When the vehicle is not crossing any of the lane marks, the image processor defines the first and second windows respectively in left and right parts below the FOE. When the vehicle is crossing any one of the lane marks, the image processor defines the third window instead of the first and second windows, the third window showing an image having the currently-crossed lane mark, and the left and right parts on the road surface in front of the vehicle or the left and right parts on the road surface behind the vehicle, with the currently-crossed lane mark positioned near a vertical center line at the center in the left-and-right direction below the FOE in the image.

The image processor sets a focus of expansion (FOE) on an upper center position of the image. When the vehicle is not crossing any of the lane marks, the image processor defines the first and second windows respectively in left and right parts below the FOE. When the vehicle is crossing any one of the lane marks, the image processor defines, together with the first and second windows, the third window in which the currently-crossed lane mark is positioned near a vertical center line at the center in a left-and-right direction below the FOE in the image.

Assuming that lane marks to be detected are straight lines, the image processor judges that the vehicle is crossing each of the lane marks when an angle between the straight line of the lane mark and a vertical line in the image is equal to or smaller than a predetermined angle.

The traveling lane detector according to the present invention is capable of detecting lane marks stably even when the vehicle is crossing a lane mark and hence reducing erroneous detection. In addition, since the traveling lane detector employs such simple window setting, speedup in image processing can be expected with this traveling lane detector.

EXPLANATION OF REFERENCE NUMERALS

101 . . . focus of expansion (FOE), 102 . . . vertical line, 103 . . . left rectangular window, 104 . . . left lane mark, 105 . . . right rectangular window, 106 . . . right lane mark, 107 . . . third window, 108 . . . currently-crossed lane mark images, 201 . . . trapezoidal window, 202 . . . small rectangular window, 401 . . . imaging unit, 402 . . . image processor, 403 . . . charge coupled device (CCD) image sensor, 404 . . . AD converter, 405 . . . video input section, 406 . . . flash ROM (FROM) (non-volatile ROM), 407 . . . central processing unit (CPU), 408 . . . random access memory (RAM), 409 . . . control area network (CAN), 410 . . . bus

DESCRIPTION OF THE PREFERRED EMBODIMENTS

Figure 1:
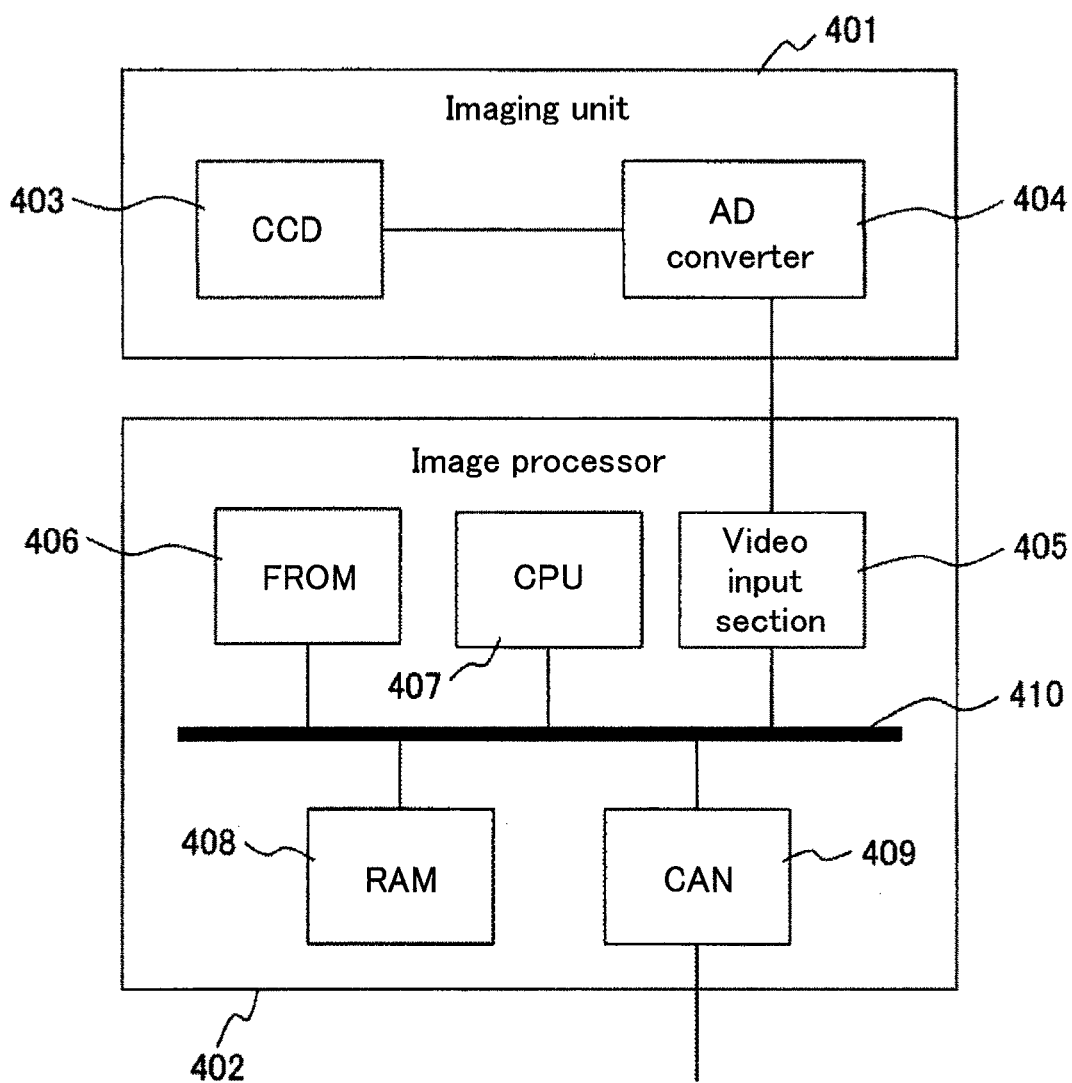
FIG. 1 is a functional block diagram showing a configuration of the present invention.

FIG. 1 is a functional block diagram showing an example of a configuration of a traveling lane detector according to an embodiment of the present invention. The traveling lane according to this embodiment includes two main units, an imaging unit 401 and an image processor 402. The imaging unit 401 includes a charge-coupled device image sensor (referred to as a CCD, below) 403 and an AD converter 404. The image processor 402 includes a video input section 405, a flash ROM (FROM) (non-volatile memory) 406, a central processing unit (CPU) 407, a random access memory (RAM) 408 and a control area network (CAN) 409. The imaging unit 401 is mounted on a vehicle in such a position that the CCD 403 can capture a road surface in front of or behind the vehicle so as to take an image of lane marks. A single or multiple windows are defined in a taken image as described below, thereby performing lane mark detection processing using image processing.

Figure 2:
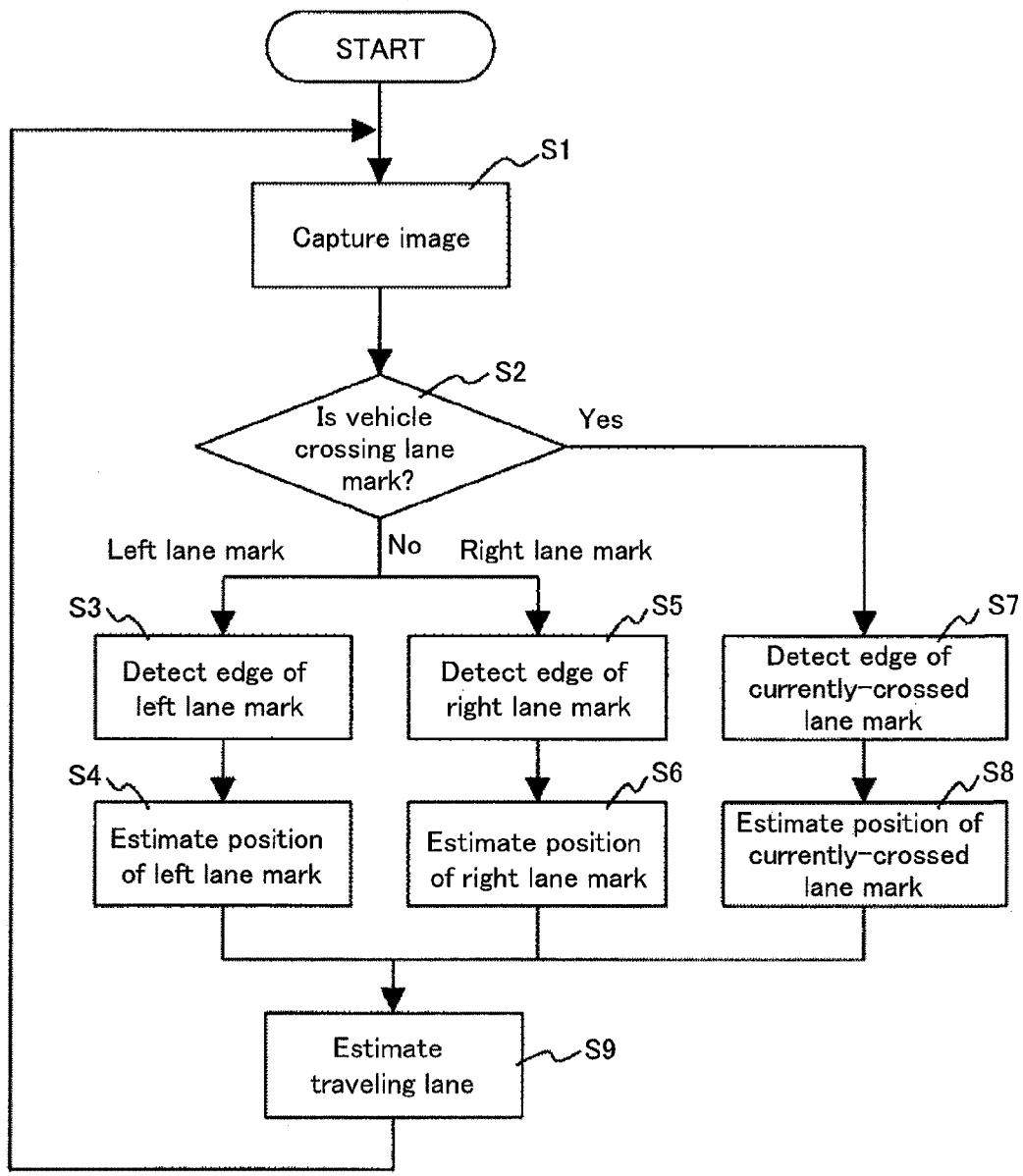
FIG. 2 is a flowchart of processing according to the present invention.

FIG. 2 is a flowchart of processing performed by the traveling lane detector according to this embodiment. The CPU 407 executes each of the steps of the processing in accordance with a program stored in advance in the FROM 406. In the following, processing performed in each of the steps is briefly described on the basis of a signal flow through the components shown in the functional block diagram of FIG. 1.

In Step S1, an image taken from the traveling vehicle is captured. In the imaging unit 401, the image thus taken, i.e., an analog image signal generated through photosensitization of the CCD 403, is converted into a digital image signal by the AD converter 404, and the digital signal is then transferred to the image processor 402. The transferred digital image signal is received at the video input section 405, and is then stored in the RAM 408 through the bus 410.

The processing from Step S2 to Step S9 is image processing for traveling lane detection. In Step S2, it is judged whether the vehicle is crossing a lane mark.

If it is judged that the vehicle is not crossing the lane mark, two windows, a left window and a right window, are defined in the image, and the positions of left and right lane marks are estimated by using the left and right windows, respectively. Steps S3 and S4 are executed for the left lane while Steps S5 and S6 are executed for the right lane; thus, estimation of left lane mark position and estimation of right lane mark position are performed independently.

If it is judged in Step S2 that the vehicle is crossing a lane mark, processing particular to the case in which the vehicle is crossing a lane mark is performed in Steps S7 and S8, to estimate the position of the lane mark the vehicle is crossing (also referred to as a currently-crossed lane mark, below). Description on the estimation of the lane mark position is given later.

Lastly, in Step S9, the position of the traveling lane is estimated on the basis of the estimated positions of the lane marks. The traveling lane detection result is transmitted to various controllers of the vehicle through the CAN 409 to be used for issue of warning to the driver, control of the steering of the vehicle and a lane guide by a car navigation system, for example. Upon completion of Step S9, the process returns to Step S1 to continuously perform traveling lane detection by using the next image.

Next, detailed description is given of the judgment and image processing performed in Steps S2 to S9.

In Step S2, the lane mark positions in the latest traveling lane detection result is used to judge whether the vehicle is crossing a lane mark. The latest result can be used because the image processing in Steps S1 to S9 is repeatedly performed in cycles of 100 ms, for example. Here, it is assumed that the vehicle is not crossing any lane mark in the first judgment immediately after the starting of the program. The following is an example of a method that can be employed to judge whether the vehicle is crossing a lane mark. Assume that a lane mark is a straight line. In this case, when the angle between a vertical line and a lane mark is equal to or smaller than predetermined degrees, 20°, for example, in the image, it is judged that the vehicle is crossing the lane mark.

Figure 3:
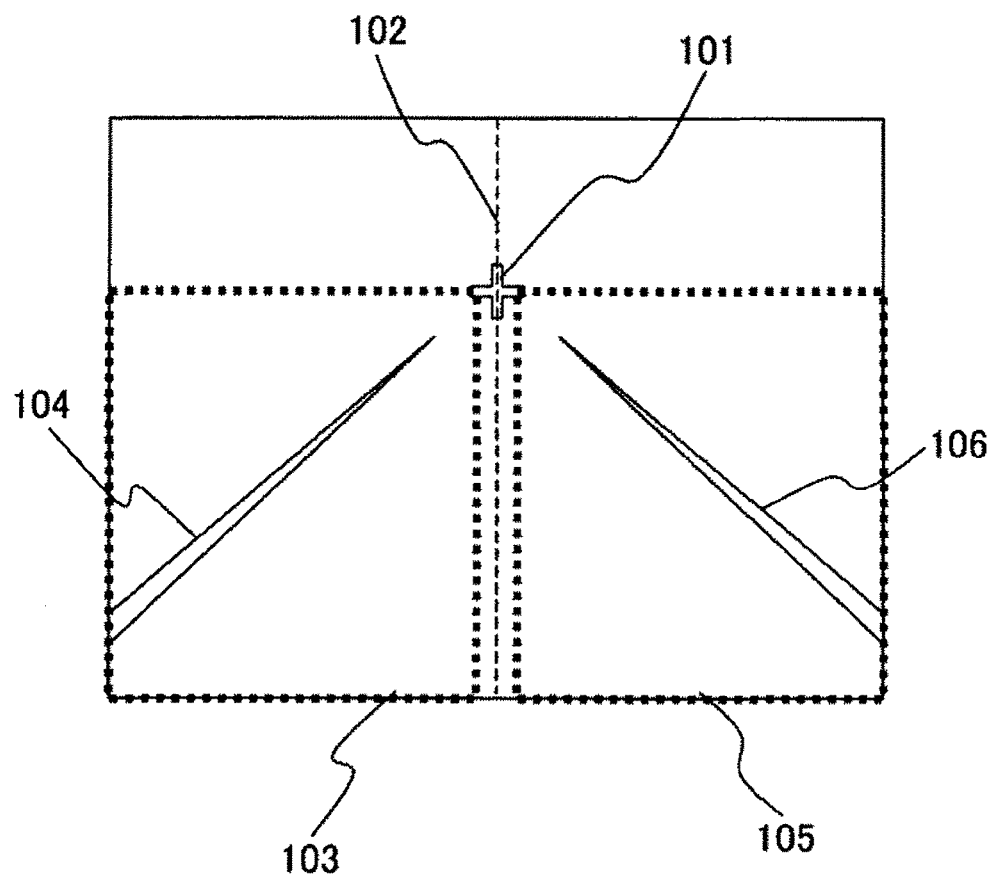
FIG. 3 is a view for describing a method for setting windows in a case where a vehicle is not crossing any lane mark, according to the present invention.

Description is first given of the case in which it is determined in Step S2 that the vehicle is not crossing any lane mark. In this case, two left and right windows are defined in the image, as described above. As shown in FIG. 3, the left and right windows divide the image taken from the vehicle into two parts, a left part and a right part, at a vertical line 102 passing a focus of expansion (FOE) 101. An FOE is an infinite-point at which lane marks respectively on the left and right sides of a vehicle cross. A reference position of an FOE is predetermined on the basis of the mounted height, the depression angle and the like of the imaging unit 401 (i.e., a camera) mounted on the vehicle, and the position is appropriately updated in accordance with lane mark detection results.

By using the windows defined so as to divide the image into the left and right parts, the left and right lane marks are successfully included in the left and right parts, respectively, as shown in FIG. 3, except when the vehicle is traveling around a curve having a large curvature. A left lane mark 104 is detected in a left rectangular window 103 defined in the left part of the image, while a right lane mark 106 is detected in a right rectangular window 105 defined in the right part of the image. Since the lane marks 104 and 106 are unlikely to be positioned above the FOE 101, the upper limit of each of the rectangular windows 103 and 105 can be set at the level of the FOE 101 as shown in FIG. 3, which contributes to a reduction in processing time. In most cases, the lane marks are located within the left rectangular window 103 and the right rectangular window 105, and can hence be detected by using such simple window setting.

Many methods have been proposed as lane mark detection methods, and the traveling lane detector according to the present invention can also use such a method. In this embodiment, the method disclosed in Japanese Patent No. 4016735 is used as an example. In this method, edge points are detected by image processing, noises are eliminated by using information on the positions and angles of the edge points, and thereby the positions of lane marks are estimated. This technique can be used in both cases where the lane marks are straight lines and where the lane marks are raised pavement markers. In this method, a Hough transform is used for estimation of straight lines serving as the lane marks.

Edge points of the left and right lane marks 104 and 106 are detected respectively in Steps S3 and S5. Then, on the basis of the detected edge points, the positions of the left and right lane marks 104 and 106 are estimated respectively in Steps S4 and S6. In the present invention, since two left and right windows are defined, different lane mark detection methods as well as different edge detection thresholds can be employed for the windows. Thus, detection is possible even when the left and right lane marks are different types.

In Step S9, a positional deviation amount S of the vehicle in relation to the traveling lane is obtained, to estimate the lane on which the vehicle is traveling. Estimation of the lane on which the vehicle is currently traveling can be made on the basis of the traveling lane at the starting time of traveling and the amount S brought about from the starting time of the traveling to the current moment. An example of a method of calculating a positional deviation amount S is the one disclosed in Japanese Patent No. 4016735, and this existing method can also be used in this embodiment.

Figure 4A:
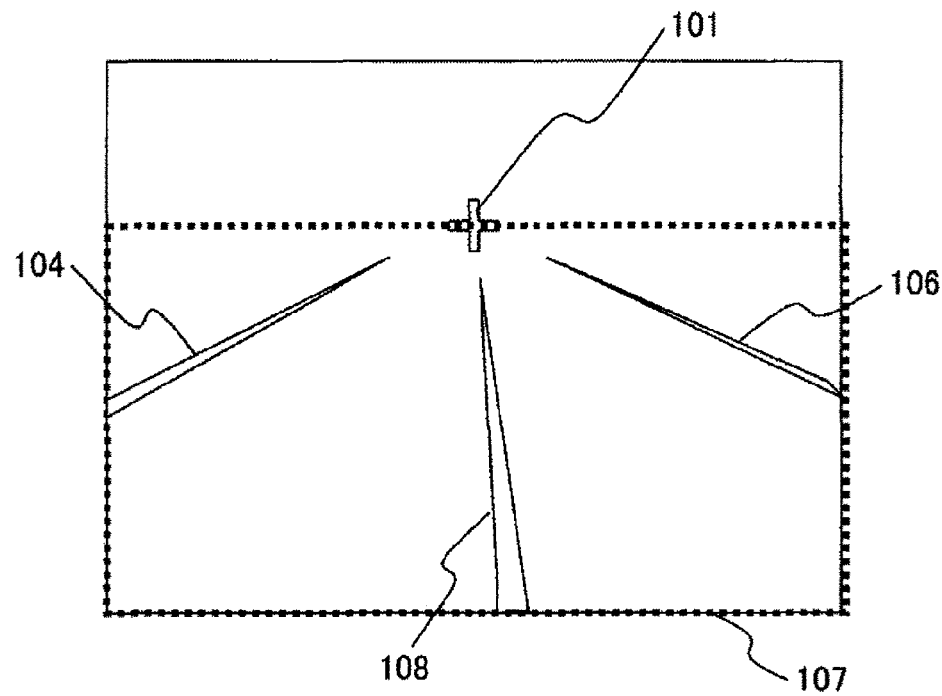
FIGS. 4A and 4B are views for describing a method for setting windows in a case where the vehicle is crossing a lane mark, according to the present invention.

If it is determined in Step S2 that the vehicle is crossing a lane mark, on the other hand, the processing in Steps S7 and S8 for detecting the lane mark which the vehicle is crossing (currently-crossed lane mark) is performed. When the vehicle is crossing a lane mark, a currently-crossed lane mark 108 is captured in a center part in a left-and-right direction of an image, as shown in FIG. 4. In this case, detection of the position of the currently-crossed lane mark 108 is important. Accordingly, in Step S7, a single window is defined as a third window 107 as shown in FIG. 4A, instead of defining left and right windows divided at the FOE 101 as shown in FIG. 3. Since the lane marks 104, 106 and 108 are unlikely to be positioned above the FOE 101, the upper limit of the third window 107 can also be set at the level of the FOE 101, which contributes to a reduction in processing time.

By defining the third window 107, the lane mark 108 is included in a window even when the vehicle is crossing the lane mark 108. When the vehicle is crossing a lane mark, the processing particular to the case in which the vehicle is crossing a lane mark is performed in Steps S7 and S8, to perform edge detection and position estimation on the currently-crossed lane mark 108. Thereby, in Step S9, the lane on which the vehicle is traveling is estimated.

Specifically, in Step S7, edge points of the lane mark 108 in the defined third window 107 are detected by means of the same method as that used in Steps S3 and S5. In Step S8, the position of the lane mark 108 is estimated on the basis of the edge points detected in the third window 107, as in Steps S4 and S6. In Step S9, as described above, a positional deviation amount S of the vehicle in relation to the traveling lane is obtained, to estimate the lane on which the vehicle is traveling. Even when the vehicle is crossing a lane mark, the lane on which the vehicle is currently travelling can be estimated on the basis of the traveling lane at the starting time of traveling and the amount S brought about from the starting time of the traveling to the current moment. However, in this case, the adjacent two lanes are estimated as the traveling lanes.

Examples of a method of setting the third window 107 are one in which, of the left rectangular window 103 and the right rectangular window 105, the window originally including the lane mark 108 the vehicle is currently crossing is selected to be used as the third window 107, and one in which a new window, different from the left rectangular window 103 and the right rectangular window 105, is used as the third window 107. An edge detection threshold, an edge detection method and the like employed for the third window 107 may be the same as or different from those employed for the left rectangular window 103 and the right rectangular window 105.

Figure 4B:
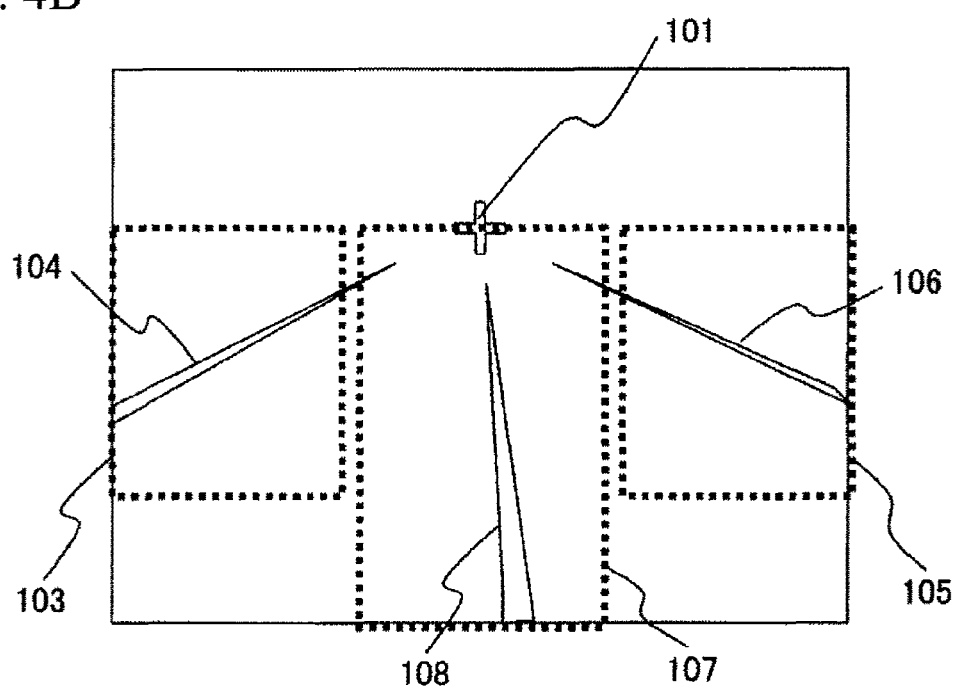
Figure 5:
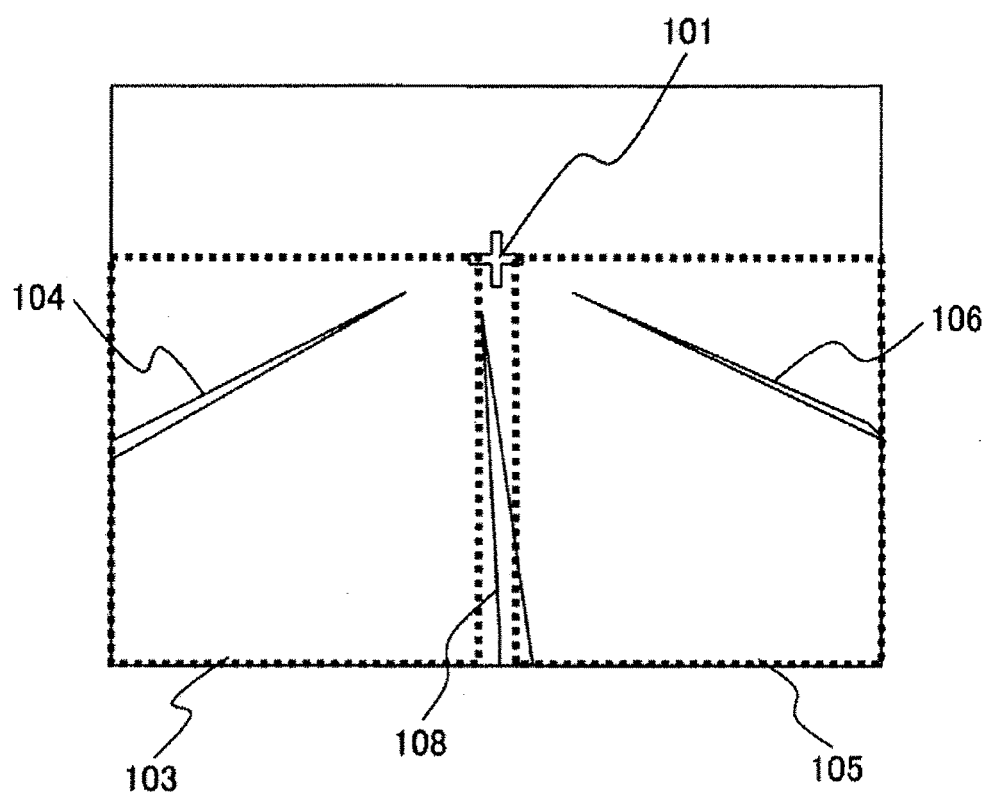
FIG. 5 is a view of a case where a lane mark is between two divided images.
Figure 6A:
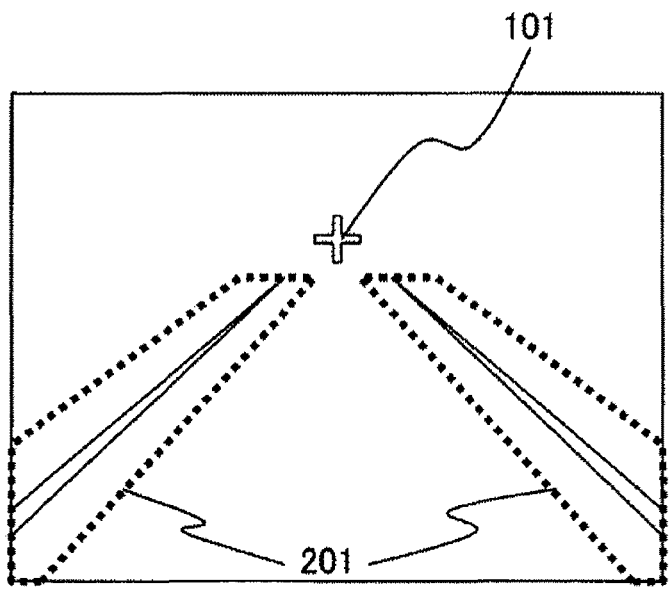
FIGS. 6A and 6B are each a view for describing a conventional method of setting windows.
Figure 6B:
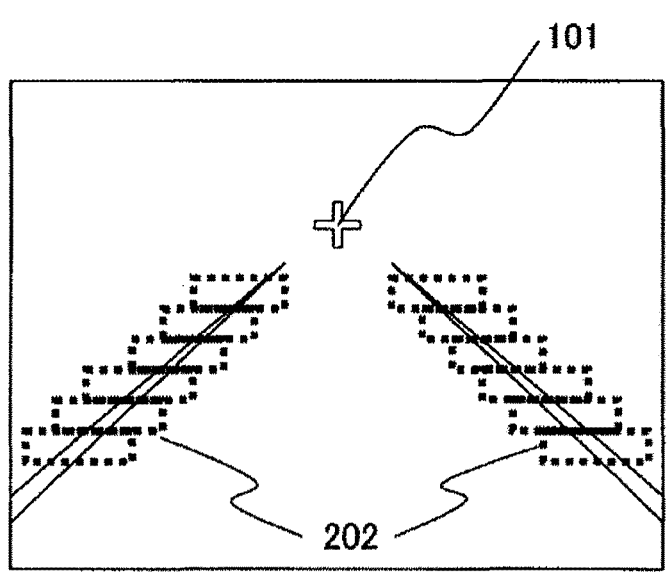

Alternatively, to detect lane marks positioned on the left and right sides of the lane mark 108 the vehicle is crossing, three windows may be defined as shown in FIG. 4B. In this case, the left lane mark 104 is detected in the left rectangular window 103 defined in a left side part of the image, the right lane mark 106 is detected in the right rectangular window 105 defined in a right side part of the image, and the lane mark 108 the vehicle is crossing is detected in the third window 107 defined in the middle. The detection method employed in this case is the same as the above-described lane mark detection processing.

What is claimed is:

1. A traveling lane detector comprising:
   an imaging unit that is mounted on a vehicle to take a single image of a road surface; and
   an image processor that performs image processing on the single image and thereby detects at least one lane mark on the road surface, wherein:
   the image processor judges whether the vehicle is crossing one of the lane marks based solely on the single image acquired by the imaging unit,
   when the vehicle is not crossing the lane mark, the image processor redefines the single image to have a first window and a second window respectively in left and right parts of the single image with respect to a center of the single image, for detecting lane marks that are located on left and right parts of a road surface ahead of or behind the vehicle, and performs image processing on portions of the single image in each of the first and second windows, thereby detecting the lane marks on the left and right parts of the road surface, and
   when the vehicle is crossing the lane mark, the image processor redefines the single image to have a third window, a fourth window, and a fifth window respectively in left, right, and center parts of the single image, for detecting the lane marks that are located on the left and right parts of a road surface ahead of or behind the vehicle, and for detecting the lane mark being crossed, and performs image processing on portions of the single image in each of the third, fourth, and fifth windows, thereby detecting the lane marks on the left and right parts of the road surface and the lane mark being crossed, wherein the fifth window is a single window that is formed to include substantially an entire width of the lane mark being crossed.

2. The traveling lane detector according to claim 1, wherein, assuming that the lane marks to be detected are straight lines, the image processor judges that the vehicle is crossing the lane mark when an angle between the straight line of the lane mark and a vertical line in the single image is equal to or smaller than a predetermined angle.

3. The traveling lane detector according, to claim 1, wherein the image processor sets a position of focus of expansion (FOE) above the center of the single image.

4. The traveling lane detector according to claim 1, wherein when the vehicle is crossing the lane mark, the lane mark being crossed is positioned substantially near the center of the single image.

5. The traveling lane detector according to claim 1, wherein when the vehicle is not crossing the lane mark, the image processing performed on the second window is different from the image processing performed on the first window.

* * * * *